(12) United States Patent
Kamiji et al.

(10) Patent No.: US 10,907,688 B2
(45) Date of Patent: Feb. 2, 2021

(54) ROTARY SEAL

(71) Applicant: NAKANISHI METAL WORKS CO., LTD., Osaka (JP)

(72) Inventors: Michiyuki Kamiji, Osaka (JP); Takahiko Sato, Osaka (JP); Shinichi Akashi, Osaka (JP); Yusuke Iizawa, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 0 days.

(21) Appl. No.: 16/449,369

(22) Filed: Jun. 22, 2019

(65) Prior Publication Data
US 2020/0003260 A1  Jan. 2, 2020

(30) Foreign Application Priority Data

Jun. 29, 2018  (JP) .................................. 2018-124124

(51) Int. Cl.
*F16C 19/18* (2006.01)
*F16C 33/78* (2006.01)
(Continued)

(52) U.S. Cl.
CPC ........ *F16C 33/7879* (2013.01); *F16C 19/184* (2013.01); *F16C 33/7823* (2013.01);
(Continued)

(58) Field of Classification Search
CPC .. F16C 19/184; F16C 19/186; F16C 33/7806; F16C 33/7823; F16C 33/7879;
(Continued)

(56) References Cited

U.S. PATENT DOCUMENTS

| | | | | |
|---|---|---|---|---|
| 5,431,413 A | * | 7/1995 | Hajzler | F16C 33/7879 277/317 |
| 6,637,754 B1 | * | 10/2003 | Ohtsuki | F16C 19/186 277/549 |
| 7,592,798 B2 | * | 9/2009 | Yabe | F16C 19/186 324/174 |
| 9,102,196 B2 | * | 8/2015 | Sanaka | F16C 33/768 |
| 9,440,489 B2 | * | 9/2016 | Haepp | B60B 27/0073 |
| 9,534,636 B2 | * | 1/2017 | Takayama | G01P 3/443 |
| 2009/0127796 A1 | * | 5/2009 | Kanzaki | F16J 15/3264 277/562 |

(Continued)

FOREIGN PATENT DOCUMENTS

| | | | | |
|---|---|---|---|---|
| JP | 2008249015 A | * | 10/2008 | ............ F16C 41/007 |
| JP | 2009168103 A | * | 7/2009 | .......... F16C 33/7883 |

(Continued)

*Primary Examiner* — Marcus Charles
(74) *Attorney, Agent, or Firm* — Kratz, Quintos & Hanson, LLP

(57) ABSTRACT

A radial gap between an outer circumferential surface of an encoder member joined to an outward flange portion of a slinger and an inner circumferential surface of a seal body includes a first gap portion and a second gap portion closer to an inward flange portion of a core metal than the first gap portion is. The outer circumferential surface that defines the first gap portion is a cylindrical outer circumferential surface, and the radial gap in the first gap portion is substantially constant in an axial direction. The outer circumferential surface that defines the second gap portion is a conical outer circumferential surface reduced in diameter as approaching the inward flange portion of the core metal in the axial direction, and the radial gap in the second gap portion is gradually increased as approaching the inward flange portion of the core metal in the axial direction.

3 Claims, 8 Drawing Sheets

(51) Int. Cl.
*F16J 15/32* (2016.01)
*F16J 15/3264* (2016.01)

(52) U.S. Cl.
CPC ....... *F16C 33/7873* (2013.01); *F16J 15/3264* (2013.01); *F16C 2240/30* (2013.01); *F16C 2240/40* (2013.01); *F16C 2326/02* (2013.01)

(58) Field of Classification Search
CPC ........................ F16C 33/7873; F16C 33/7886; F16C 33/805; F16C 2240/20; F16C 2240/40; F16C 2326/02; F16C 2240/30; F16J 15/164; F16J 15/324; F16J 15/3232; F16J 15/3264
USPC ......... 384/448, 477–478, 486; 277/353, 402, 277/549, 562, 571; 324/174
See application file for complete search history.

(56) References Cited

U.S. PATENT DOCUMENTS

| | | | | |
|---|---|---|---|---|
| 2014/0225332 | A1* | 8/2014 | Baart | F16C 33/7876 |
| | | | | 277/549 |
| 2017/0284471 | A1* | 10/2017 | Shibayama | F16C 33/7883 |

FOREIGN PATENT DOCUMENTS

| | | | | | |
|---|---|---|---|---|---|
| JP | 2011099464 | A | * | 5/2011 | .......... F16C 33/7879 |
| JP | 2012-229763 | A | | 11/2012 | |
| JP | 2012229763 | A | * | 11/2012 | .......... F16C 33/7883 |
| JP | 2014-109330 | A | | 6/2014 | |
| JP | 2014190465 | A | * | 10/2014 | .......... F16C 33/7883 |
| JP | 2015-086993 | A | | 5/2015 | |
| JP | 2018155348 | A | * | 10/2018 | .............. F16C 41/00 |

* cited by examiner

PRIOR ART

PRIOR ART

ROTARY SEAL

BACKGROUND OF THE INVENTION

(1) Field of the Invention

The present invention relates to a rotary seal for use in a rotary shaft of a transport machine or a general machine.

(2) Description of Related Art

For example, there has been a rotary seal for use in a rotary shaft of a bearing device for supporting a wheel of an automobile. Such a rotary seal includes a slinger attached to an inner ring of the bearing device; a core metal attached to an outer ring of the bearing device; and a seal body composed of a seal member joined to the core metal (for example, refer to Patent Literatures 1 to 3).

An axial lip (for example, a side lip 26a of Patent Literature 1, a side lip 13b of Patent Literature 2, or an axial lip 17a of Patent Literature 3) of the seal member is located on the outermost side of the seal member. Accordingly, the followability of the seal member may deteriorate due to entrance of muddy water or the like, and sealability thereof may decrease.

In view of the above, in the rotary seal, in order to inhibit the penetration of muddy water or the like, a minute gap is provided radially outward from the axial lip (for example, refer to Patent Literatures 1 to 3).

In the rotary seal in FIG. 1 of Patent Literature 1, a labyrinth portion Lp between an encoder 28 provided on a slinger 20 and a seal body 22 is formed into an L-shape in cross section, which includes an axial labyrinth 1Lp and a radial labyrinth 2Lp.

Moreover, in a rotary seal of FIG. 2 in Patent Literature 2, a labyrinth portion between a slinger 11 and a seal plate 10 is formed into an L-shape in cross section, which includes a radial first labyrinth seal 15 and an axial second labyrinth seal 16.

Furthermore, in a rotary seal of FIG. 3 in Patent Literature 2, a labyrinth portion between a magnetic encoder 19 fixed to the slinger 18 and the seal plate 10 is formed into an L-shape in cross section, which includes the radial first labyrinth seal 15 and the axial second labyrinth seal 16.

Still further, in a rotary seal of FIG. 2 to FIG. 5 in Patent Literature 3, labyrinth structures r1 and r2 between an elastic member 18 and a seal body (a core metal 14 and a seal lip member 17) are formed as tapered surfaces which are parallel to each other and expand in diameter toward a side opposite to a bearing space S, and such a tapered surface of an elastic member 18 is provided with muddy water discharging means 19 including protruding portions 19a and recessed portions 19b, which are repeatedly formed along a circumferential direction of the tapered surface.

CITATION LIST

Patent Literature

Patent Literature 1: Japanese Unexamined Patent Application Publication No. 2012-229763
Patent Literature 2: Japanese Unexamined Patent Application Publication No. 2014-109330
Patent Literature 3: Japanese Unexamined Patent Application Publication No. 2015-086993

SUMMARY OF THE INVENTION

In each of the conventional rotary seals as described above, a minute gap is provided radially outward from the axial lip. Accordingly, it seems to be difficult for muddy water or the like to penetrate the rotary seal because of the sealing function, and thus the axial lip is difficult to wet.

Here, the inventors of the present application have performed tests on a variety of rotary seals for actually observing a state of the axial gap of the rotary seal, and have found that, when the conventional rotary seal is used in an environment of being splashed with muddy water, the muddy water clings to an end of the radial gap, and muddy water in a region close to a seal inner space scatters by centrifugal force generated by rotation of a rotary shaft, and the axial lip is sometimes wetted.

In also the rotary seal having the labyrinth portion formed into an L-shape in cross section as in Patent Literatures 1 and 2, a minute gap is extended. Accordingly, it is conceived that muddy water is present across an entire region of the minute gap due to the large surface tension of water, and in addition, the muddy water clings to an end of the minute gap, which is close to the seal inner space, and the muddy water that clings to the region close to the seal inner space scatters by the centrifugal force.

Hence, the conventional rotary seal has room for improvement from a viewpoint of further enhancing wet-proof performance of the axial lip and inhibiting the decrease of sealing performance.

In view of the above-mentioned circumstances, it is an object of the present invention to provide a rotary seal capable of further enhancing the wet-proof performance of the axial lip and inhibiting the decrease of the sealing performance.

On the basis of a result of the test of actually observing a state of the axial gap of the rotary seal, the inventors of the present application have assiduously studied a structure in which even if the centrifugal force acts on the muddy water, the muddy water that clings to the region close to the seal inner space of the axial gap is prevented from scattering to the seal inner space, while muddy water is held, by surface tension of the muddy water, in a radial gap having the axial length set to a fixed value or more. As a result, the inventors of the present application have conceived that a second gap portion close to an inward flange portion of a core metal is provided in addition to the radial gap (a first gap portion) the axial length of which is set to a fixed value or more, and completed the present invention through tests and evaluations for a variety of shapes.

A rotary seal according to the present invention is as follows.

[1] A rotary seal includes:
a slinger attached to an inner diameter-side member;
a core metal attached to an outer diameter-side member; and
a seal body including a seal member joined to the core metal,
in which the slinger includes a slinger-cylindrical portion fitted to an outside of the inner diameter-side member and an outward flange portion extending radially outward from an end of the slinger-cylindrical portion in a direction parallel to an axial direction along a rotary shaft of the inner diameter-side member,
the core metal includes a core-metal cylindrical portion fitted to an inside of the outer diameter-side member and an inward flange portion extending radially inward from an end of the core-metal cylindrical portion in a direction parallel to the axial direction,
the seal member includes an axial lip brought into sliding contact with the outward flange portion of the slinger, a radial gap between an inner circumferential surface of the seal body and an outer circumferential surface of a joined member joined to the outward flange portion of the slinger includes a first gap portion and a second gap portion closer to the inward flange portion of the core metal than the first gap portion is, the outer circumferential surface that defines the first gap portion is a cylindrical or substantially cylindrical outer circumferential surface, the radial gap in the first gap portion is substantially constant in a direction parallel to the axial direction, the outer circumferential surface that defines the second gap portion is a conical or substantially conical outer circumferential surface, which is reduced in diameter as approaching the inward flange portion of the core metal in a direction parallel to the axial direction, and the radial gap in the second gap portion is gradually increased as approaching the inward flange portion of the core metal in a direction parallel to the axial direction.

[2] In the rotary seal according to the aforementioned [1], the joined member includes an encoder member, a synthetic resin member, or a synthetic rubber member.

[3] A rotary seal includes:

a slinger attached to an inner diameter-side member;

a core metal attached to an outer diameter-side member; and a seal body including a seal member joined to the core metal, in which the slinger includes a slinger-cylindrical portion fitted to an outside of the inner diameter-side member and an outward flange portion extending radially outward from an end of the slinger-cylindrical portion in a direction parallel to an axial direction along a rotary shaft of the inner diameter-side member, the core metal includes a core-metal cylindrical portion fitted to an inside of the outer diameter-side member and an inward flange portion extending radially inward from an end of the core-metal cylindrical portion in a direction parallel to the axial direction, the seal member includes an axial lip brought into sliding contact with the outward flange portion of the slinger, a radial gap between the inner circumferential surface of the seal body and an outer circumferential surface of a bent portion formed by bending the outward flange portion of the slinger includes a first gap portion and a second gap portion closer to the inward flange portion of the core metal than the first gap portion is, the outer circumferential surface that defines the first gap portion is a cylindrical or substantially cylindrical outer circumferential surface, the radial gap in the first gap portion is substantially constant in a direction parallel to the axial direction, the outer circumferential surface that defines the second gap portion is a conical or substantially conical outer circumferential surface, which is reduced in diameter as approaching the inward flange portion of the core metal in a direction parallel to the axial direction, and the radial gap in the second gap portion is gradually increased as approaching the inward flange portion of the core metal in a direction parallel to the axial direction.

In accordance with such a configuration, the radial gap of the rotary seal includes the first gap portion and the second gap portion closer to the inward flange portion of the core metal than the first gap portion is; the radial gap in the first gap is substantially constant in the direction parallel to the axial direction: the radial gap in the second gap portion is gradually increased as approaching the inward flange portion of the core metal in the direction parallel to the axial direction; and muddy water that penetrates first to the radial gap from the outside air is held in the radial gap by surface tension of the muddy water.

Here, "muddy water that penetrates first" refers to muddy water that penetrates in an initial period when the rotary seal gets wet. When such a wet state is cleared, or a wet amount is reduced, a water film disappears due to scattering, evaporation or the like. When the rotary seal gets wet once more, muddy water that initially penetrates at that time is held in the radial gap by surface tension of the muddy water.

Hence, the muddy water is held in the radial gap by the surface tension thereof, whereby the muddy water can be prevented from being penetrating the inside of the bearing.

In addition, in the second gap portion, the radial gap is gradually increased as approaching the inward flange portion of the core metal in the direction parallel to the axial direction. The second gap portion having such a shape is provided, and thus, water even having large surface tension does not cling to an end of the radial gap, which is close to the seal inner space, and an end of the muddy water held in the radial gap, which is close to the seal inner space, is located closer to the outside air than a side end of the outer circumferential surface of the encoder member, the synthetic resin member or the synthetic rubber member, or a side end of the seal inner space of the outer circumferential surface of the bent portion of the slinger.

Hence, even if the centrifugal force generated by the rotation of the inner diameter-side member acts on the muddy water held in the radial gap, the muddy water does not scatter to the seal inner space. Accordingly, the wet-proof performance of the axial lip can be further enhanced, and the decrease of the sealing performance can be inhibited.

Further, the rotary seal has a simple structure without a complicated labyrinth structure, and accordingly, an increase of manufacturing cost can be suppressed.

As described above, the rotary seal according to the present invention produces the effects as below.

(1) Muddy water can be prevented from penetrating the inside of the bearing.

(2) Even if the centrifugal force generated by the rotation of the inner diameter-side member acts on the muddy water held in the radial gap, the muddy water does not scatter to the seal inner space. Accordingly, the wet-proof performance of the axial lip can be further enhanced, and the decrease of the sealing performance can be inhibited.

(3) The rotary seal has a simple structure without a complicated labyrinth structure, thereby preventing manufacturing cost from increasing.

DETAILED DESCRIPTION OF PREFERRED EMBODIMENT

An embodiment according to the present invention is described below with reference to the drawings.

In the present specification, it should be noted that, in a state in which a rotary seal is attached to an inner diameter-side member and an outer diameter-side member, a direction along a rotary shaft of the inner diameter-side member that works as a rotating member is referred to as "axial direction", and a direction orthogonal to the axial direction is referred to as "radial direction".

Moreover, in a bearing device for supporting a wheel of an automobile, a direction from a vehicle body of the automobile toward the wheel is referred to as "outward", and a direction opposite thereto is referred to as "inward".

The inner diameter-side member and the outer diameter-side member, onto which the rotary seal of the present invention is attached, are coaxial with each other. Here, the present invention also includes a case that axial centers of these members are shifted from each other (that is, a case where these members are misaligned with each other).

<Bearing Device>

Figure 1:
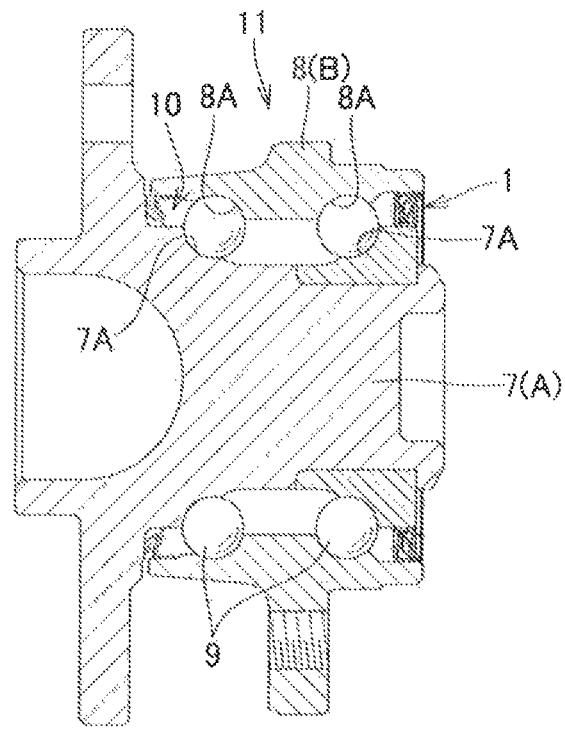
FIG. 1 is a partial longitudinal cross-sectional schematic view showing an example in which a rotary seal according to an embodiment of the present invention is used for a bearing device for supporting a wheel of an automobile.

A partial longitudinal cross-sectional schematic view in FIG. 1 shows an example in which a rotary seal 1 according to the embodiment of the present invention is used for a bearing device 11 for supporting a wheel of an automobile.

The bearing device 11 includes a bearing having: an inner ring 7 that serves as an inner diameter-side member A, has an inner ring raceway surface 7A on its outer circumferential surface, and rotates together with the wheel; an outer ring 8 that serves as an outer diameter-side member B, has an outer ring raceway surface 8A on its inner circumferential surface, and is integral with a vehicle body; balls 9 which are rolling elements rolling between the inner ring raceway surface 7A and the outer ring raceway surface 8A; and others.

Moreover, the bearing device 11 includes rotary seals 1 and 10, which prevent penetration of muddy water or the like and leakage of lubricating grease, on inward and outward end portions (inward of the inward balls 9 and outward of the outward balls 9) between the inner ring 7 and outer ring 8 of the bearing. In addition, the bearing device 11 includes inward an encoder device that detects a rotation speed (the number of revolutions) of the wheel.

<Inward Rotary Seal>

Figure 2:
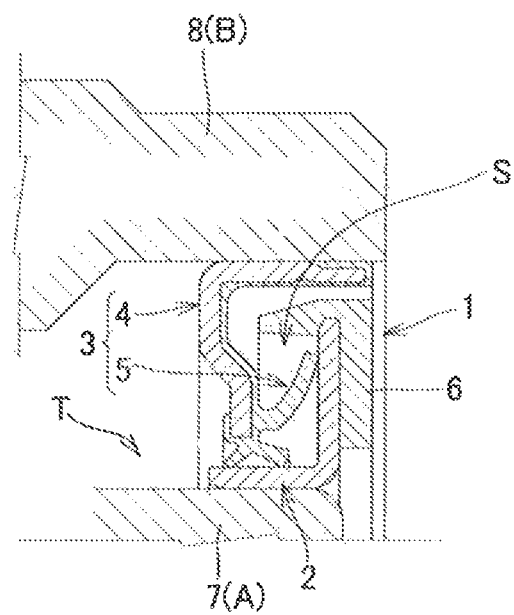
FIG. 2 is an enlarged longitudinal cross-sectional view of a main part of the rotary seal.
Figure 3:
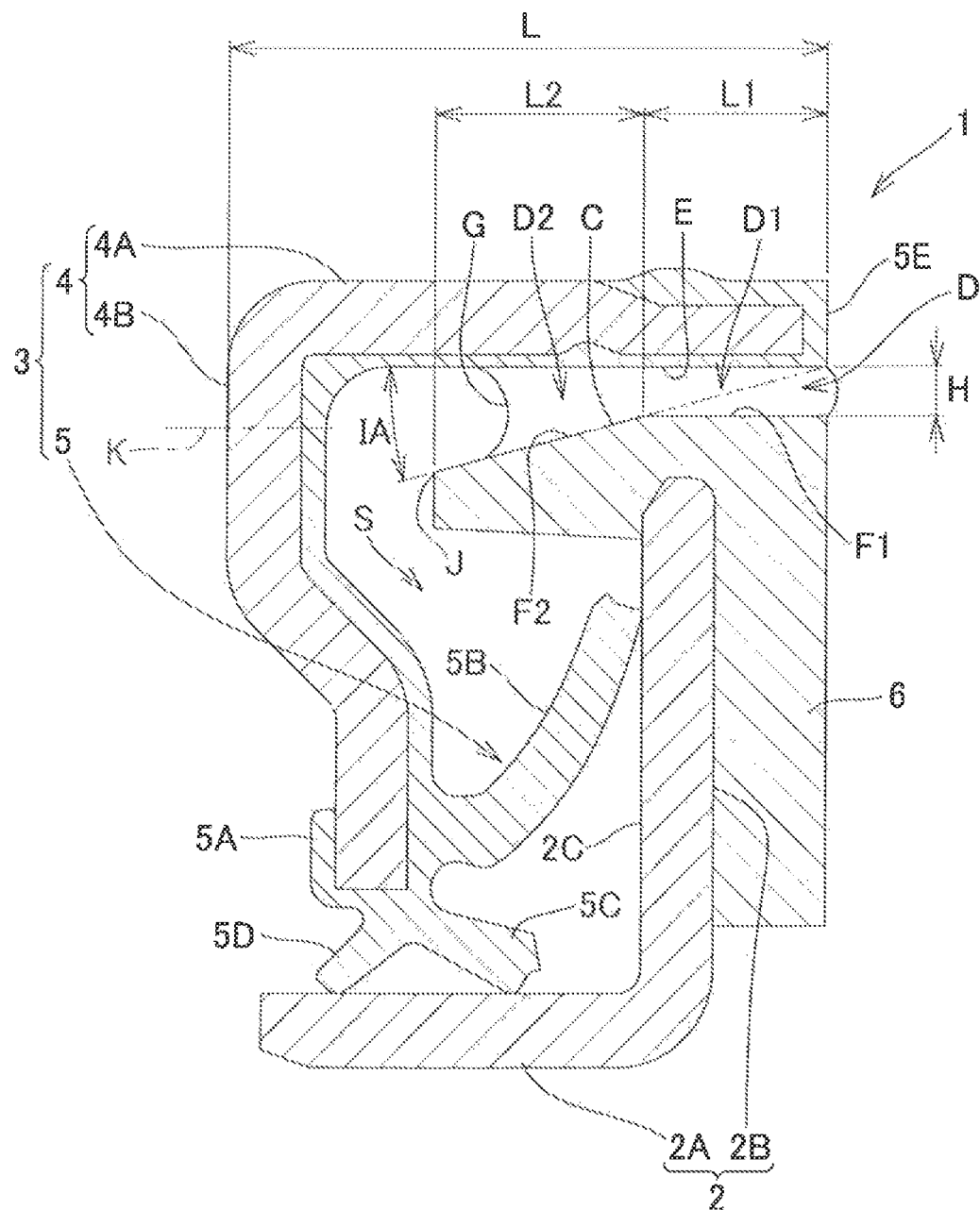
FIG. 3 is an end view of a cut portion taken along a plane including the axial direction of the rotary seal.

As shown in the enlarged longitudinal cross-sectional view of a main part in FIG. 2 and the end view of the cut portion in FIG. 3, the inward rotary seal 1 of the bearing device 11 includes a slinger 2 attached to the inner ring 7; a core metal 4 attached to an outer ring 8; and a seal body 3 composed of a seal member 5 joined to the core metal 4.

The slinger 2 is composed of a slinger-cylindrical portion 2A fitted to an outside of the inner ring 7 and of an outward flange portion 2B extending radially outward from an end (an inward side end) of the slinger-cylindrical portion 2A in the direction parallel to the axial direction.

To the outward flange portion 2B, an encoder member 6 including a rubber magnet or a plastic magnet, which composes the encoder device, is joined as a joined member. A sensor (not shown) that composes the encoder device faces the encoder member 6 in the direction parallel to the axial direction.

The core metal 4 includes a core-metal cylindrical portion 4A fitted to an inside of the outer ring 8, and an inward flange portion 4B extending radially inward from an end (an outward end) of the core-metal cylindrical portion 4A in the direction parallel to the axial direction.

The slinger 2 and the core metal 4 are made of, for example, a stainless steel plate through presswork.

To the core metal 4, a base 5A of the seal member 5 that is synthetic rubber is adhered by vulcanization.

The seal member 5 has a lip structure including: an axial lip 5B that extends from the base 5A and is brought into sliding contact with a vertical surface 2C of the outward flange portion 2B of the slinger 2; and a radial lip 5C and a grease lip 5D which are brought into sliding contact with an outer circumferential surface of the slinger-cylindrical portion 2A of the slinger 2.

The seal member 5 has an outer circumferential seal portion 5E that covers a tip end (an inward side end) of the core-metal cylindrical portion 4A of the core metal 4. The outer circumferential seal portion 5E connects to the base 5A from an inner circumferential surface side of the core-metal cylindrical portion 4A.

Here, an inner circumferential surface E of the seal body 3 including the core metal 4 and the seal member 5 is a cylindrical surface.

As the synthetic rubber material that forms the seal member 5, one or more types of rubber materials having good oil resistance can be appropriately blended and used. Such rubber materials include nitrile rubber (NBR), hydrogenated nitrile rubber (HNBR), acrylic rubber (ACM), ethylene acrylic rubber (AEM), fluororubber (FKM, FPM), and silicone rubber (VQM). In view of: the kneading processability of the rubber material; the vulcanization moldability thereof; and the adhesiveness thereof to the core metal 4, the rubber material may be used by blending them with other types of rubber, for example, liquid NBR, ethylene propylene rubber (EPDM), natural rubber (NR), isoprene rubber (IR), styrene butadiene rubber (SBR), and butadiene rubber (BR).

As shown in the cut portion end view in FIG. 3, a radial gap D between an outer circumferential surface C of the encoder member 6 joined to the outward flange portion 2B of the slinger 2 and the inner circumferential surface E of the seal body 3 includes a first gap portion D1 and a second gap portion D2 closer to the inward flange portion 4B of the core metal 4 than the first gap portion D1 is.

The outer circumferential surface C of the encoder member 6, which forms the first gap portion D1, is a cylindrical outer circumferential surface F1, and the radial gap D in the first gap portion D1 is substantially constant in the direction parallel to the axial direction.

The outer circumferential surface C of the encoder member 6, which forms the second gap portion D2, is a conical outer circumferential surface F2 reduced in diameter as approaching the inward flange portion 4B of the core metal 4 in the direction parallel to the axial direction, and the radial gap D in the second gap portion D2 is gradually increased as approaching the inward flange portion 4B of the core metal 4 in the axial direction.

Note that neither the protruding portion nor the recessed portion, which is as described in Patent Literature 3 and composes the muddy water discharging means, is provided on the outer circumferential surface C (the outer circumferential surfaces F1 and F2) of the encoder member 6.

Surface tension (72.75 mN/m at 20° C.) of water is larger than surface tensions of many other liquids (at 20° C., for example, 23.30 mN/m in acetone, 22.55 mN/m in ethanol, and 22.60 mN/m in methanol), and accordingly, water is prone to cling to the radial gap D.

A shape of the outer circumferential surface C (the outer circumferential surfaces F1 and F2) of the encoder member 6 is set so as to provide the first gap portion D1 and the second gap portion D2 in the radial gap D, to prevent the scattering of a part of water, for example, muddy water G, which is located close to a seal inner space S, due to centrifugal force generated by rotation of the inner ring 7, when the muddy water clings to the radial gap D as described above.

That is, the outer circumferential surface C of the encoder member 6, which defines the second gap portion D2, is set to the conical outer circumferential surface F2 reduced in diameter as approaching the inward flange portion 4B of the core metal 4 in the direction parallel to the axial direction. In this way, the radial gap D in the second gap portion D2 is gradually increased as approaching the inward flange portion 4B of the core metal 4 in the direction parallel to the axial direction.

The second gap portion D2 having such a shape is provided, and accordingly, even water having large surface tension does not cling to the end portion of the radial gap D, which is close to the seal inner space S. As shown in FIG. 3, an end of the muddy water G held in the radial gap D, the end being close to the seal inner space S, is located closer to the outside air than a seal inner space side end (a side end of the inward flange portion 4B) J of the outer circumferential surface C (the conical outer circumferential surface F2) of the encoder member 6.

Hence, even if the centrifugal force generated by the rotation of the inner ring 7 as an inner diameter-side member A that rotates together with the wheel acts on the muddy water G held in the radial gap D, the muddy water G does not scatter to the seal inner space S. Accordingly, the wet-proof performance of the axial lip 5B can be further enhanced, and the decrease of the sealing performance can be inhibited.

Next, numeric ranges of specifications L1, L2, IA and H, which are shown in FIG. 3, are described.

When a length of the rotary seal 1 in the direction parallel to the axial direction is L, a length L1 of the first gap portion D1 in the direction parallel to the axial direction is L1≥L×0.2 on the basis of test results described later. This allows a water film to be stably held by the surface tension of water.

When the length of the rotary seal 1 in the direction parallel to the axial direction is L, a length L2 of the second gap portion D2 in the direction parallel to the axial direction is L2≥L×0.2 on the basis of test results described later. This allows the muddy water G to be collected to the first gap portion D1 by the centrifugal force.

Moreover, L1+L2≤L×0.8 is established. This allows the encoder member 6 to be prevented from interfering with the inward flange portion 4B of the core metal 4.

An inclination angle IA of the conical outer circumferential surface F2 with respect to the inner circumferential surface E of the seal body 3 may be set to 5o≤IA≤30°, and may be set to 10°≤IA≤25°. The above-described range is a range of the inclination angle IA, which makes it possible to collect the muddy water G to the first gap portion D by the centrifugal force.

A radial length H of the first gap portion D1 may be set to 0.3 mm≤H≤1.0 mm, and may be set to 0.3 mm≤H≤0.5 mm. Such setting of H≥0.3 mm is made in order to eliminate interference between the seal body 3 and the encoder member 6, which is caused by slipping out of the centers of the inner ring 7 and the outer ring 8 from each other upon the application of the load. Such setting of H≤1.0 mm is made in order to stably hold the water film by the surface tension of water.

Modified Example

Figure 4:
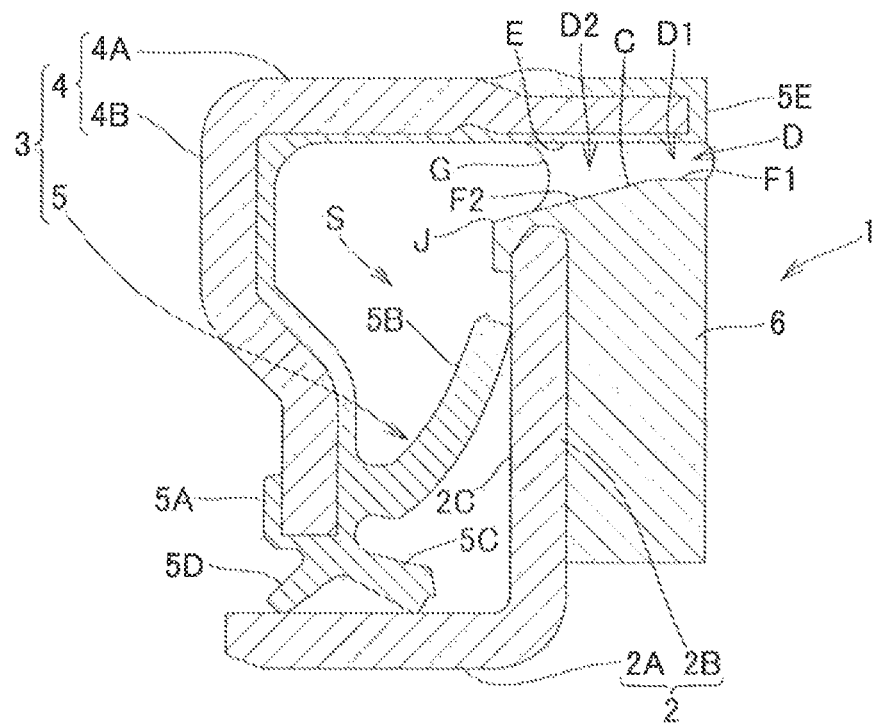
FIG. 4 is an end view of a cut portion taken along a plane including the axial direction of a rotary seal according to a first modified example.

In the rotary seal 1 including the encoder member 6, a thickness of the encoder member 6 may be increased as in a first modified example shown in the view of the end portion of a cut portion in FIG. 4.

The conical outer circumferential surface F2 that defines the second gap portion D2 may be provided at any position in the direction parallel to the axial direction in response to required specifications for the bearing. This increases the degree of freedom in designing the rotary seal 1.

Figure 5:
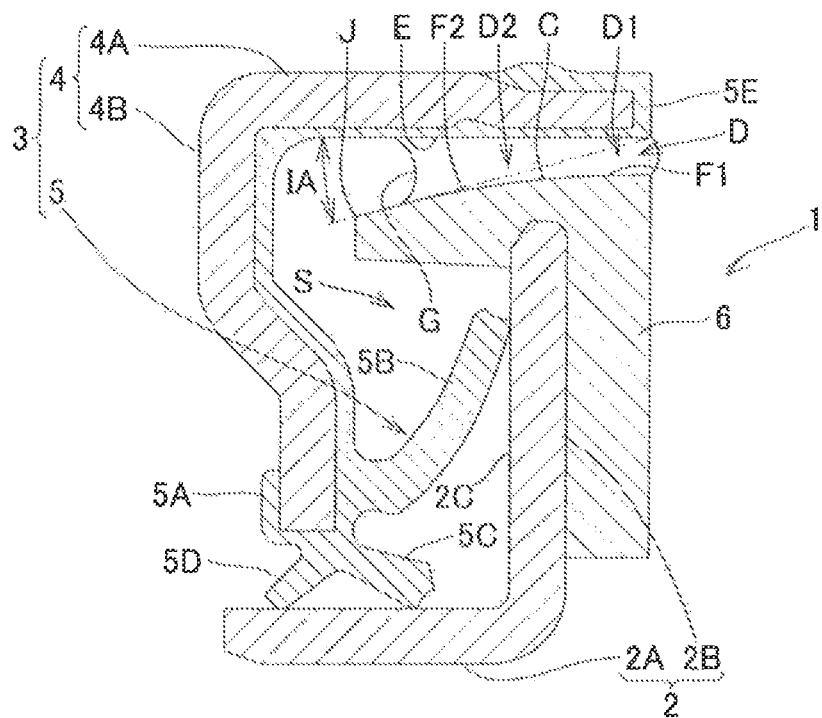
FIG. 5 is an end view of a cut portion taken along a plane including the axial direction of a rotary seal according to a second modified example.

As in a second modified example shown in the view of the end portion of a cut portion in FIG. 5, the outer circumferential surface C of the encoder member 6, which defines the first gap portion D1 and the second gap portion D2, may be circular.

Here, the outer circumferential surface F1 is formed into a substantially cylindrical shape approximate to a cylinder, thus making it possible to stably hold the water film by the surface tension of the water.

Moreover, the outer circumferential surface F2 is formed into a substantially conical shape approximate to a cone, thus making it possible to collect the muddy water G to the first gap portion D1 by the centrifugal force. This prevents the muddy water G from scattering to the seal inner space S even if the centrifugal force acts on the muddy water G.

Here, an inclination angle IA of a tangential line (a chain double-dashed line) of the seal inner space side end J of the outer circumferential surface F2 with respect to the inner circumferential surface E of the seal body 3 may be set to 5°≤IA≤30°, and may be set to 10°≤IA≤25°. The inclination angle IA is shown in FIG. 5

Note that, as a matter of course, the outer circumferential surface F1 that defines the first gap portion D1 may be formed into a cylindrical shape, and the outer circumferential surface F2 that defines the second gap portion D2 may be formed into a circular arc shape (a substantially conical shape approximate to a cone), or the outer circumferential surface F1 that defines the first gap portion D1 may be formed into a circular arc shape (a substantially cylindrical shape approximate to a cylinder), and the outer circumferential surface F2 that defines the second gap portion D2 may be formed into a cone.

That is, the outer circumferential surface F1 that defines the first gap portion D1 is formed into a cylindrical or substantially cylindrical shape, and the outer circumferential surface F2 that defines the second gap portion D2 is formed into a conical or substantially conical shape, which is reduced in diameter as approaching the inward flange portion 4B of the core metal 4 in the direction parallel to the axial direction.

The function of the encoder device may not be necessary depending on a spot where the rotary seal 1 is used. In such a case, a synthetic resin member or a synthetic rubber member may be used as the joined member joined to the outward flange portion 2B, in place of the encoder member 6 as a rubber magnet or a plastic magnet. In this case, the synthetic resin member or the synthetic rubber member defines the first gap portion D1 and the second gap portion D2.

Moreover, when the function of the encoder device is not necessary depending on the spot where the rotary seal 1 is used, the first gap portion D1 and the second gap portion D2 may be formed of the slinger 2 itself without forming the first gap portion D1 and the second gap portion D2 from a synthetic resin member or a synthetic rubber member.

Figure 6:
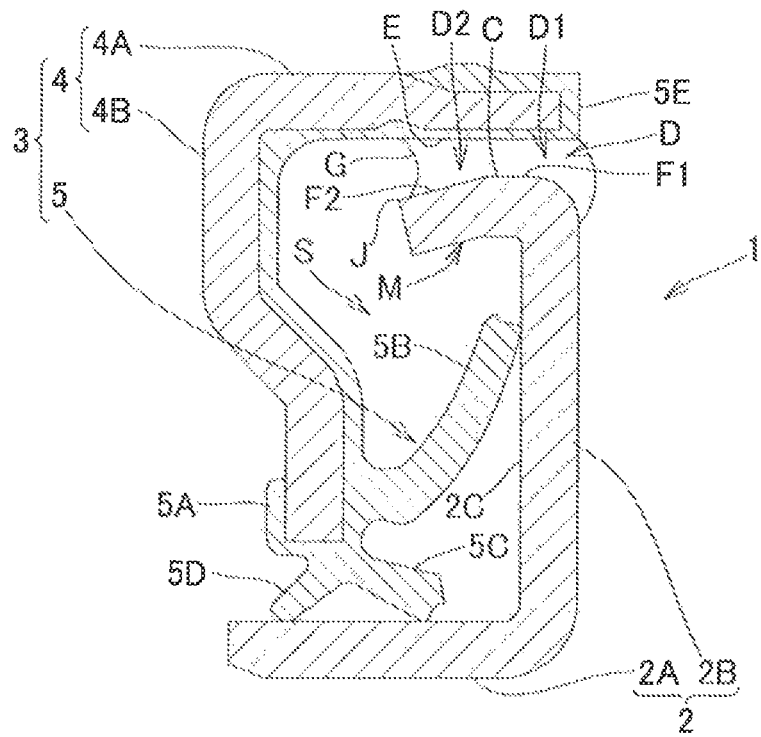
FIG. 6 is an end view of a cut portion taken along a plane including the axial direction of a rotary seal according to a third modified example.
Figure 7:
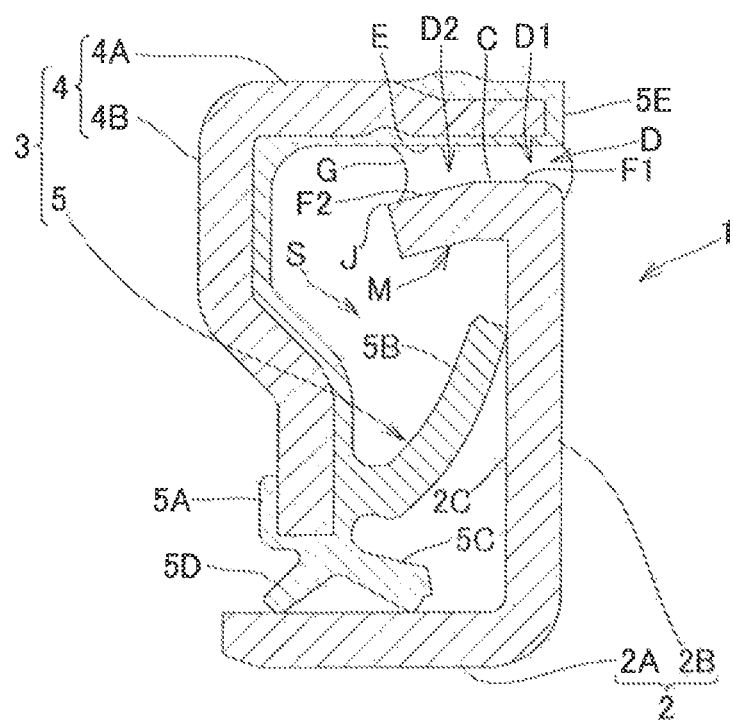
FIG. 7 is an end view of a cut portion taken along a plane including the axial direction of a rotary seal according to a fourth modified example.
Figure 8:
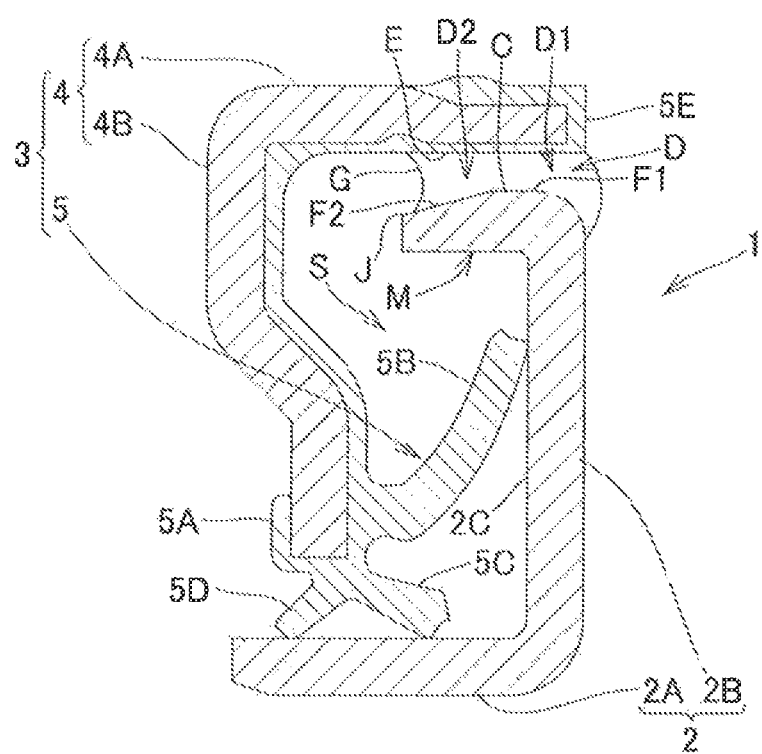
FIG. 8 is an end view of a cut portion taken along a plane including the axial direction of a rotary seal according to a fifth modified example.

That is, as in a third modified example shown in the view of the end portion of a cut portion in FIG. 6, a fourth modified example shown in the view of the end portion of a cut portion in FIG. 7 and a fifth modified example shown in the view of the end portion of a cut portion in FIG. 8, the outer circumferential surface F1 that defines the first gap portion D1 and the outer circumferential surface F2 that defines the second gap portion D2 may be formed from an outer circumferential surface C of a bent portion M formed by bending the outward flange portion 2B of the slinger 2.

In that case also, the outer circumferential surface F1 is formed into a cylindrical or substantially cylindrical shape, and the outer circumferential surface F2 is formed into a conical or substantially conical shape, which is reduced in diameter as approaching the inward flange portion of the core metal in the direction parallel to the axial direction.

Herein, in the third modified example in FIG. 6, the outer circumferential surface F2 of the bent portion M is inclined from the middle thereof into a conical shape.

Moreover, in the fourth modified example in FIG. 7, a curvature radius of an inside corner portion of the bent portion M in the third modified example in FIG. 6 is set to substantially zero, and a length of a cylindrical surface of the outer circumferential surface F1 is set larger than that in the third modified example shown in FIG. 6.

Furthermore, in the fifth modified example in FIG. 8, the outer circumferential surface F2 is subjected to squeezing processing or removal processing in a plate thickness direction, so as to be formed into a conical shape.

<Radial Gap Observation Test>

(1) Test for determining dimension of length L of first gap portion D1 in direction parallel to the axial direction in FIG. 3

Figure 9:
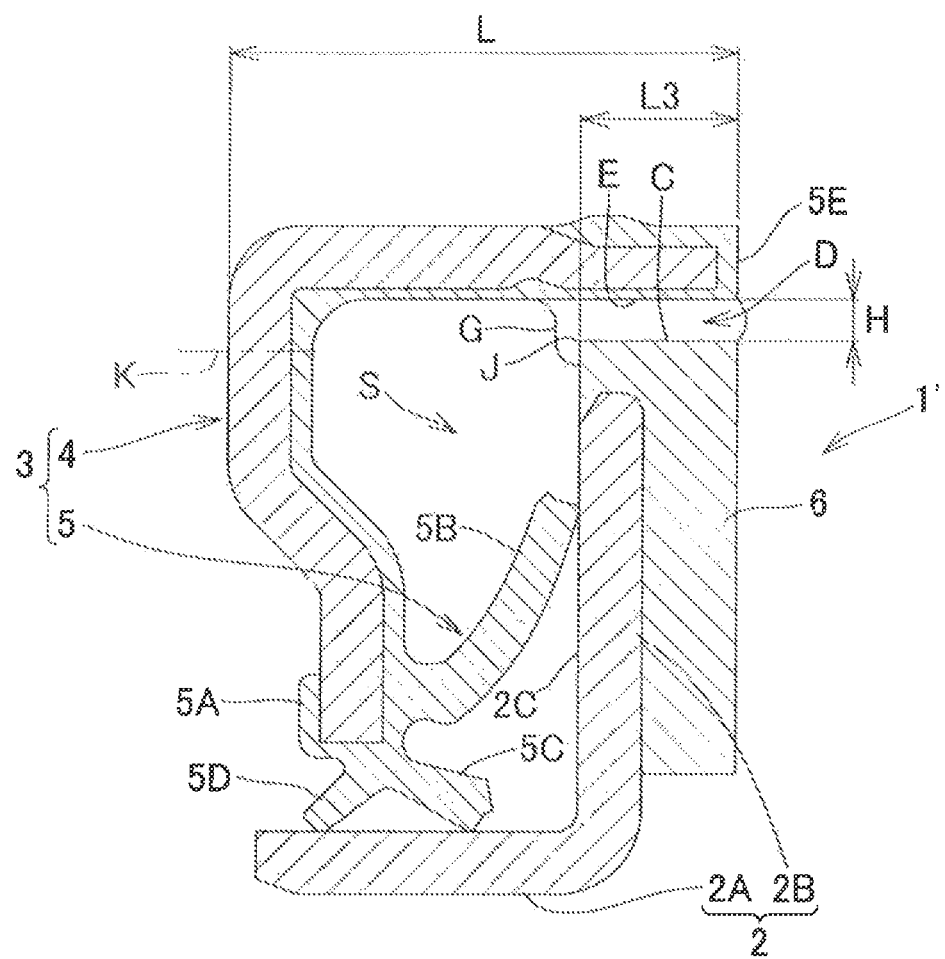
FIG. 9 is an end view of a cut portion taken along a plane including the axial direction of a rotary seal according to a conventional example.
Figure 10:
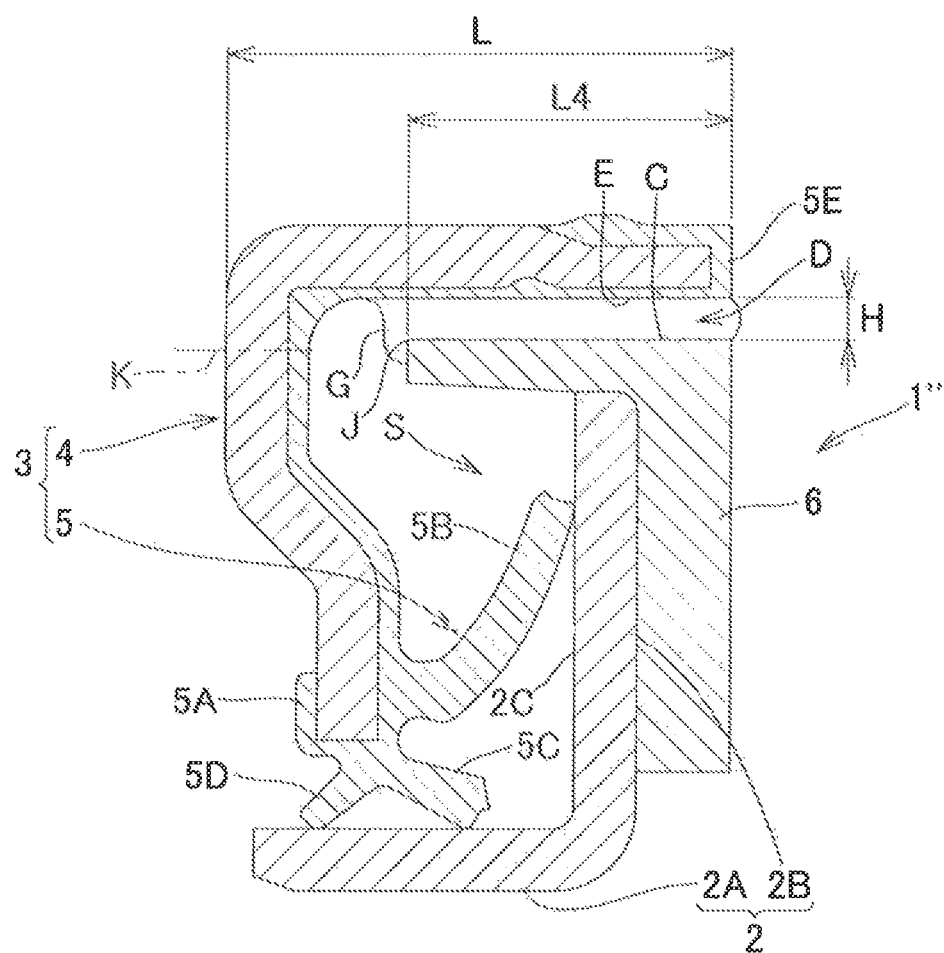
FIG. 10 is an end view of a cut portion taken along a plane including the axial direction of a rotary seal according to another conventional example.

In a rotary seal 1' having a conventional shape in the view of the end portion of a cut portion in FIG. 9 and a rotary seal 1" having a conventional shape in the view of the end portion of a cut portion in FIG. 10, L=5 mm and H=0.4 mm are commonly set. With regard to a length L3 of a radial gap D of the rotary seal 1' in the direction parallel to the axial direction and a length L4 of a radial gap D of the rotary seal 1" in the direction parallel to the axial direction, L3 and L4 each having specifications shown in Table 1 are compared with one another.

(Test Method)

Figure 11A:
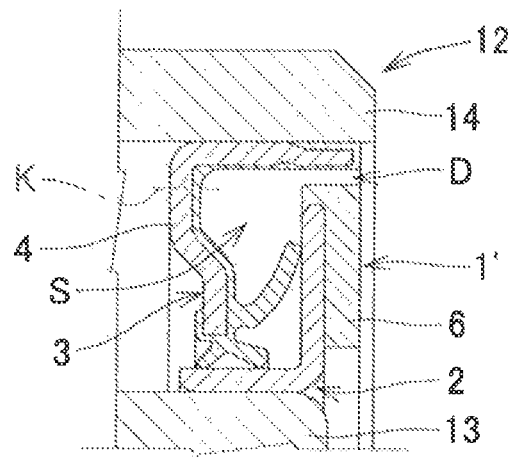
FIG. 11A is an enlarged longitudinal cross-sectional view of a main part, showing a state where the rotary seal with the conventional shape in FIG. 9 is attached to a test fixture that simulates a bearing device for supporting a wheel of an automobile.
Figure 11B:
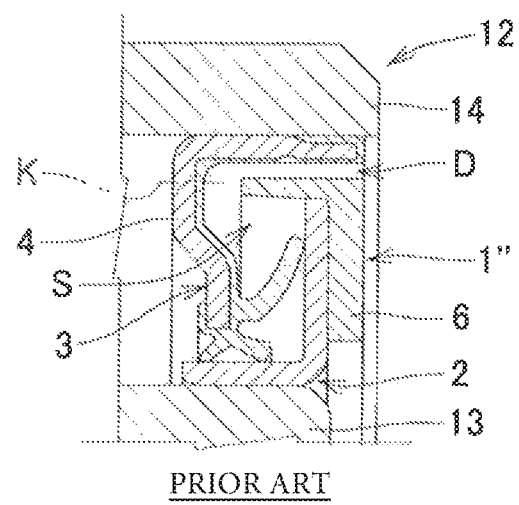
FIG. 11B is an enlarged longitudinal cross-sectional view of a main part, showing a state where the rotary seal with the conventional shape in FIG. 10 is attached to the test fixture that simulates the bearing device for supporting the wheel of the automobile.

A test fixture 12 is used, which is shown in enlarged longitudinal cross-sectional views of main parts in FIG. 11A and FIG. 11B, and simulates such a bearing device for supporting a wheel of an automobile as in FIG. 1. The rotary seal 1' is attached to the test fixture 12 as shown in FIG. 11A, the rotary seal 1" is attached to the test fixture 12 as shown in FIG. 11B, and a dummy outer ring 14 that is an outer diameter-side member B to which the core metal 4 is fitted is mounted to a position decentered from an axial center by 0.1 mm in total indicator reading (TIR).

The test fixture 12 in FIG. 11A, to which the rotary seal 1' is attached, and the test fixture 12 in FIG. 11B, to which the rotary seal 1" is attached, are fabricated one by one. Axial centers of the respective test fixtures 12 are set horizontal, and muddy water at a water temperature of 23° C., in which mud (Kanto loam powder) of 10% by weight is mixed, is put to positions of the axial centers of the respective test fixtures 12.

While rotating a dummy inner ring 13 that is the inner diameter-side member A at a rotation speed of 1500 rpm with respect to the dummy outer ring 14 that is the outer diameter-side member B for 1 hour in that state, the radial gap D close to the seal inner space S in each of the rotary seals 1' and 1" is observed from a hole drilled at an observation position K in each of FIGS. 9, 10, 11A, and 11B, whereby a behavior of the muddy water is checked.

TABLE 1

| Axial lengths L3, L4 | | Ratio with respect to L | Test result |
|---|---|---|---|
| L3 | 0.6 mm | L × 0.12 | The muddy water G directly passed through the radial gap D and scattered into the seal inner space S. |
| | 1.0 mm | L × 0.2 | The muddy water G clinging once to the radial gap D close to the seal inner space S, but protruded to the seal inner space S from the encoder member 6. The muddy water that thus protruded scattered into the seal inner space S by the centrifugal force generated by the rotation of the inner ring 7. |
| | 1.5 mm | L × 0.3 | The muddy water G clinging once to the radial gap D close to the seal inner space S, but protruded to the seal inner space S from the encoder member 6. The muddy water that thus protruded scattered into the seal inner space S by the centrifugal force generated by the rotation of the inner ring 7. |

TABLE 1-continued

| Axial lengths L3, L4 | Ratio with respect to L | Test result |
|---|---|---|
| L4  3.2 mm | L × 0.64 | The muddy water G clinging once to the radial gap D close to the seal inner space S, but protruded to the seal inner space S from the encoder member 6. The muddy water that thus protruded scattered into the seal inner space S by the centrifugal force generated by the rotation of the inner ring 7. |

(Test Results)

From the test results shown in Table 1, it is seen that, when the length (L3, L4) of the radial gap D in the direction parallel to the axial direction is 1 mm or more (L×0.2 or more), the muddy water G can be held once in the radial gap D by the surface tension. Moreover, even if the length of the radial gap D in the direction parallel to the axial direction is sufficiently lengthened (L4=3.2 mm), the obtained result was similar to the case of L3=1.0 mm where the length of the radial gap D in the direction parallel to the axial direction is short.

From the above test results, the length L1 of the first gap portion D1 in the direction parallel to the axial direction is set as L1≥L×0.2 in the rotary seal 1 shown in FIG. 3.

(2) Test for Determining Dimension of Length L2 of Second Gap Portion D2 in Direction Parallel to the Axial Direction in FIG. 3

Next, in the rotary seal 1 shown in FIG. 3, L1≥L×0.2 is set to hold the muddy water G in the radial gap D by the surface tension, and then a test was performed while changing a length of the length L2 of the second gap portion D2 in direction parallel to the axial direction in order to prevent the muddy water G from scattering into the seal inner space S even if the centrifugal force acts thereon.

In the rotary seal 1 shown in FIG. 3, Comparative example 1, Example 1, and Example 2, which respectively have specifications shown in Table 2, are compared with one another, with regard to the length L2 in direction parallel to the axial direction, under the condition that L=5 mm, H=0.4 mm, L1=1.5 mm and IA=15° are commonly set.

(Test Method)

Figure 11C:
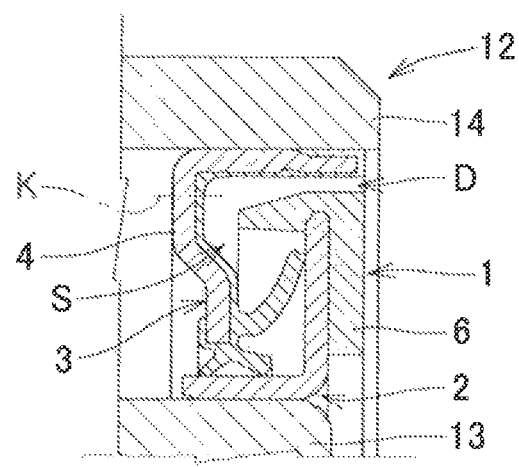
FIG. 11C is an enlarged longitudinal cross-sectional view of a main part, showing a state where the rotary seal according to the embodiment of the present invention with the shape in FIG. 3 is attached to the test fixture that simulates the bearing device for supporting the wheel of the automobile.

The test fixture 12 is used, which is shown in an enlarged longitudinal cross-sectional view of a main part in FIG. 11C, and simulates the bearing device for supporting a wheel of an automobile as in FIG. 1. The rotary seal 1 is attached to the test fixture 12 as shown in FIG. 11C, and the dummy outer ring 14 that is an outer diameter-side member B to which the core metal 4 is fitted is mounted to the position decentered from the axial center by 0.1 mm in total indicator reading (TIR).

Such test fixtures 12 attached with the rotary seals 1 with changed lengths L2 in the direction parallel to the axial direction are fabricated one by one. Axial centers of the respective test fixtures 12 are set horizontal, and muddy water at a water temperature of 23° C., in which mud (Kanto loam powder) of 10% by weight is mixed, is put to positions of the axial centers of the respective test fixtures 12.

While rotating a dummy inner ring 13 that is the inner diameter-side member A at a rotation speed of 1500 rpm with respect to the dummy outer ring 14 that is the outer diameter-side member B for 1 hour in that state, the radial gap D close to the seal inner space S in each of the rotary seals 1 is observed from a hole drilled at an observation position K in each of FIG. 3 and FIG. 11C, whereby a behavior of the muddy water is checked.

TABLE 2

| Comparative example/ Examples | Axial length L1 | Ratio with respect to L | Axial length L2 | Ratio with respect to L | IA | Test result |
|---|---|---|---|---|---|---|
| Comparative example | 1.5 mm | L × 0.3 | 0.75 mm | L × 0.15 | 15° | No effect of the second gap portion D2 was observed, and the muddy water G scattered into the seal inner space S by the centrifugal force generated by the rotation of the inner ring 7. |
| Example 1 | | | 1.0 mm | L × 0.2 | | As shown in FIG. 3, the muddy water G did not protrude to the seal inner space S from the encoder member 6, and the end of the muddy water G held in the radial gap D by the large surface tension of water, the end being close to the seal inner space S, was located closer to the outside air than the side end J of the inward flange portion 4B of the outer circumferential surface C (the conical outer circumferential surface F2) of the encoder member 6 was. |
| Example 2 | | | 1.7 mm | L × 0.34 | | As shown in FIG. 3, the muddy water G did not protrude to the seal inner space S from the encoder member 6, and the end of the muddy water G held in the radial gap D by the large surface tension of water, the end being close to the seal inner space S, was located closer to the outside air than the side end J of the inward flange portion 4B of the outer circumferential surface C (the conical outer circumferential surface F2) of the encoder member 6 was. |

(Test Results)

As in test results shown in Table 2, in Comparative example 1 (L2=0.75 mm: L×0.15), no effect of the second gap portion D2 was observed, and the muddy water G scattered into the seal inner space S by the centrifugal force generated by the rotation of the inner ring 7.

In contrast, in each of Example 1 (L2=1.0 mm: L×0.2) and Example 2 (L2=1.7 mm: L×0.34), the muddy water G did not protrude to the seal inner space S from the encoder member 6, like the muddy water G shown in FIG. 3, and an end of the muddy water G that was held in the radial gap D by the large surface tension of water, and was close to the seal inner space S, was located closer to the outside air than the side end J of the inward flange portion 4B of the outer circumferential surface C (the conical outer circumferential surface F2) of the encoder member 6 was.

From the above test results, the length L2 in the direction parallel to the axial direction of the second gap portion D2 is set as L2≥L×0.2 in the rotary seal 1 shown in FIG. 3.

<Muddy Water Penetration Test>

Example and Comparative Examples

As the example of the present invention, Example 2 (L1=1.5 mm: L×0.3, L2=1.7 mm: L×0.34) in Table 2 is used. As comparative examples, the condition of L3=1.5 mm (L×0.3) in Table 1 is used as Comparative example 2, and the condition of L4=3.2 mm (L×0.64) in Table 1 is used Comparative example 3.

(Test Method)

Each of the rotary seals 1, 1' and 1" of Example 2 and Comparative example 2 and Comparative example 3 is attached to the bearing device for supporting a wheel of an automobile as in FIG. 1. The outer ring 8 that is the outer diameter-side member B to which the core metal 4 is fitted is mounted to the position decentered from the axial center by 0.1 mm in total indicator reading (TIR).

The above-described bearing device attached with the rotary seal 1 in Example 2, the above-described bearing device attached with the rotary seal 1' in Comparative example 2 and the above-described bearing device attached with the rotary seal 1" in Comparative example 3 are fabricated two by two. Axial centers of the respective bearing devices are set horizontal, and muddy water at a water temperature of 23° C., which is prepared by mixing mud (Kanto loam powder) of 10% by weight, is put to positions of the axial centers of the respective bearing devices.

In that state, each of the inner rings 7 which are the inner diameter-side members A is rotated at a rotation speed of 1500 rpm with respect to the outer ring 8 that is the outer diameter-side member B, and it is observed every day whether leakage occurs in a bearing inside T in FIG. 2.

(Test Result)

In Comparative example 2, the muddy water started to leak to the bearing insides T in the above-described two bearing devices, 11 days and 7 days after the start of the test.

In Comparative example 3, the muddy water started to leak to the bearing insides T in the above-described two bearing devices, 14 days and 12 days after the start of the test.

In contrast, in Example 2, no leakage of the muddy water to the bearing insides T occurred in the above-described two bearing devices, even after the lapse of 25 days since the start of the test. Accordingly, the test was discontinued after the lapse of 25 days since the start of the test.

From the above test results, it is seen that the rotary seal 1 according to the embodiment of the present invention has extremely high sealing performance.

The description of the above embodiment is entirely illustrative. Varieties of improvements and alterations can be made without departing from the scope of the present invention.

What is claimed is:

1. A rotary seal comprising:
   a slinger attached to an inner diameter-side member;
   a core metal attached to an outer diameter-side member; and
   a seal body including a seal member joined to the core metal,
   wherein
   the slinger includes a slinger-cylindrical portion fitted to an outside of the inner diameter-side member and an outward flange portion extending radially outward from an end of the slinger-cylindrical portion in a direction parallel to an axial direction along a rotary shaft of the inner diameter-side member,
   the core metal includes a core-metal cylindrical portion fitted to an inside of the outer diameter-side member and an inward flange portion extending radially inward from an end of the core-metal cylindrical portion in a direction parallel to the axial direction,
   the seal member includes an axial lip brought into sliding contact with the outward flange portion of the slinger,
   a radial gap between an inner circumferential surface of the seal body and an outer circumferential surface of a joined member joined to the outward flange portion of the slinger includes a first gap portion and a second gap portion closer to the inward flange portion of the core metal than the first gap portion is,
   the outer circumferential surface that defines the first gap portion is a cylindrical or substantially cylindrical outer circumferential surface,
   the radial gap in the first gap portion is substantially constant in a direction parallel to the axial direction,
   the outer circumferential surface that defines the second gap portion is a conical or substantially conical outer circumferential surface, which is reduced in diameter as approaching the inward flange portion of the core metal in a direction parallel to the axial direction,
   the radial gap in the second gap portion is gradually increased as approaching the inward flange portion of the core metal in a direction parallel to the axial direction,
   an inclination angle IA defined by the conical or substantially conical outer circumferential surface with respect to the inner circumferential surface of the seal body is set to 5°≤IA≤30°,
   when a length of the rotary seal in the direction parallel to the axial direction is L,
   a length L1 of the first gap in the direction parallel to the axial direction is set to L1≥L×0.2,
   a length L2 of the second gap portion in the direction parallel to the axial direction is set to L2≥L×0.2, and L1+L2≤L×0.8, and
   a radial length H of the first gap portion is set to 0.3 mm≤H≤1.0 mm.

2. The rotary seal according to claim 1, wherein the joined member includes an encoder member, a synthetic resin member, or a synthetic rubber member.

3. A rotary seal comprising:

a slinger attached to an inner diameter-side member;

a core metal attached to an outer diameter-side member; and a seal body including a seal member joined to the core metal, wherein the slinger includes a slinger-cylindrical portion fitted to an outside of the inner diameter-side member and an outward flange portion extending radially outward from an end of the slinger-cylindrical portion in a direction parallel to an axial direction along a rotary shaft of the inner diameter-side member, the core metal includes a core-metal cylindrical portion fitted to an inside of the outer diameter-side member and an inward flange portion extending radially inward from an end of the core-metal cylindrical portion in a direction parallel to the axial direction, the seal member includes an axial lip brought into sliding contact with the outward flange portion of the slinger, a radial gap between the inner circumferential surface of the seal body and an outer circumferential surface of a bent portion formed by bending the outward flange portion of the slinger includes a first gap portion and a second gap portion closer to the inward flange portion of the core metal than the first gap portion is, the outer circumferential surface that defines the first gap portion is a cylindrical or substantially cylindrical outer circumferential surface, the radial gap in the first gap portion is substantially constant in a direction parallel to the axial direction, the outer circumferential surface that defines the second gap portion is a conical or substantially conical outer circumferential surface, which is reduced in diameter as approaching the inward flange portion of the core metal in a direction parallel to the axial direction, the radial gap in the second gap portion is gradually increased as approaching the inward flange portion of the core metal in a direction parallel to the axial direction, an inclination angle IA defined by the conical or substantially conical outer circumferential surface with respect to the inner circumferential surface of the seal body is set to $5° \leq IA \leq 30°$, when a length of the rotary seal in the direction parallel to the axial direction is L, a length L1 of the first apportion in the direction parallel to the axial direction is set to $L1 \geq L \times 0.2$, a length L2 of the second gap portion in the direction parallel to the axial direction is set to $L2 \geq L \times 0.2$, and $L1+L2 \leq L \times 0.8$, and a radial length H of the first gap portion is set to $0.3 \text{ mm} \leq H \leq 1.0 \text{ mm}$.

* * * * *